United States Patent [19]
Smith, III

[11] 3,785,409
[45] Jan. 15, 1974

[54] CLAMPING APPARATUS FOR RESISTANCE WELDING OF MULTIPLE WIRES FORMING A WELL SCREEN

[75] Inventor: Howard F. Smith, III, Houston, Tex.

[73] Assignee: Howard Smith Company, Houston, Tex.

[22] Filed: Oct. 31, 1972

[21] Appl. No.: 302,424

Related U.S. Application Data

[63] Continuation-in-part of Ser. No. 260,403, June 7, 1972, abandoned.

[52] U.S. Cl. ......... 140/92.2, 29/163.5 CW, 72/142, 72/144, 140/112, 269/287
[51] Int. Cl. .............................................. B21f 3/00
[58] Field of Search ........................... 140/92.2, 112; 29/163.5 CW, 200 P; 72/142, 144; 219/56; 269/254 CS, 287, 288

[56] References Cited
UNITED STATES PATENTS

| | | | |
|---|---|---|---|
| 2,846,968 | 8/1958 | Tipton | 260/287 |
| 2,800,867 | 7/1957 | Smith | 269/287 |
| 2,327,686 | 8/1943 | Williams et al. | 29/163.5 CW |
| 2,327,687 | 8/1943 | Williams et al. | 29/163.5 CW |
| 2,312,458 | 3/1943 | Williams et al. | 29/163.5 CW |
| 2,127,828 | 8/1938 | Milton | 269/287 |
| 1,808,913 | 6/1931 | Wilson | 29/163.5 CW |

Primary Examiner—Charles W. Lanham
Assistant Examiner—James R. Duzan
Attorney—Pravel, Wilson & Matthews

[57] ABSTRACT

Clamping apparatus for confining and maintaining electrical contact with multiple longitudinally extending rib wires during the resistance welding thereof to wire wrapped thereon for forming a well screen or the like, wherein the clamping apparatus compensates for wear thereon. The apparatus may be automatically adjustable for wear and also variable in diameter to permit forming the welded screen on upset tubing and on other pipe having variations in the outside diameter thereof while still effecting the electrical contact required for reliable and sound resistance welding of the multiple rib wires to the wrapping wire.

10 Claims, 3 Drawing Figures

CLAMPING APPARATUS FOR RESISTANCE WELDING OF MULTIPLE WIRES FORMING A WELL SCREEN

CROSS-REFERENCE TO RELATED APPLICATION

This application is a continuation-in-part of United States Pat. application, Ser. No. 260,403, filed June 7, 1972 now abandoned.

BACKGROUND OF THE INVENTION

The field of this invention is apparatus for resistance welding of multiple longitudinally disposed rib wires to wire wrapped thereon for forming well screen or the like.

Heretofore, it has been common practice to form well screen or the like by wrapping wire spirally over the multiple circumferentially spaced longitudinally disposed rib wires and welding them together during the wrapping to form well screen, as illustrated and described for example in U. S. Pat. Nos. 2,327,686 and 2,327,687. Typically, the apparatus used in the prior art included a solid guide ring with grooves for receiving and guiding each of the longitudinal rib wires as such wires were moved relative to the guide ring in the formation of the well screen. Such guide ring was a part of the electrical circuit of the resistance welding apparatus in that it provided the electrical contact with the rib wires. However, as the guide ring became worn by rubbing against the rib wires, its inner dimensions at the grooves became enlarged, and a gap developed between the rib wires and the inner surface of the guide ring, resulting in an arcing or breaking of the circuit which produced defective welds at some points, often undiscovered until the final well screen was put into use in a well.

Since well screen used at the bottom of water wells and oil wells is for the purpose of keeping well formation sand from entering the well pipe and reaching the pump and valves, it is extremely important that the wires forming the well screen be spaced apart and held to their spacing within tolerances of typically plus or minus one thousandths of an inch. If just one of the wrapping wires moves while going in the hole, an opening or enlarged gap results and the formation sand can enter such opening, which could result in the ruining of the entire well.

With the prior art apparatus, there was no assurance that the wrapping wire was continuously and uniformly welded to the rib wires therebelow so that there was no assurance that a failure of the well screen because of faulty welding would not occur. Furthermore, with the prior art apparatus, welded screen culd not be readily wrapped on upset tubing or pipe because the guide ring of a diameter to fit the pipe could not accommodate the variation in diameter of the pipe at the upset ends of the pipe. Even with standard pipe, there is some variation in the outside diameter, which has been enough to occasionally result in gaps between the prior art guide ring and the rib wires, even prior to any substantial wear of the guide ring.

Despite such problems with the prior art for a number of years, so far as is known, no one has heretofore provided a solution to the problems.

SUMMARY OF THE INVENTION

The present invention relates to an apparatus which solves the problems of the prior art and provides a continuous uniform weld of all of the wrapping wire to the rib wires, compensating for wear of the guide assembly, and variation in the support pipe due to upset ends on the pipe or normal external surface irregularities on standard pipe. The compensation may be manually or automatically accomplished by the apparatus in its several embodiments.

DESCRIPTION OF THE PREFERRED EMBODIMENTS

Figure 1:
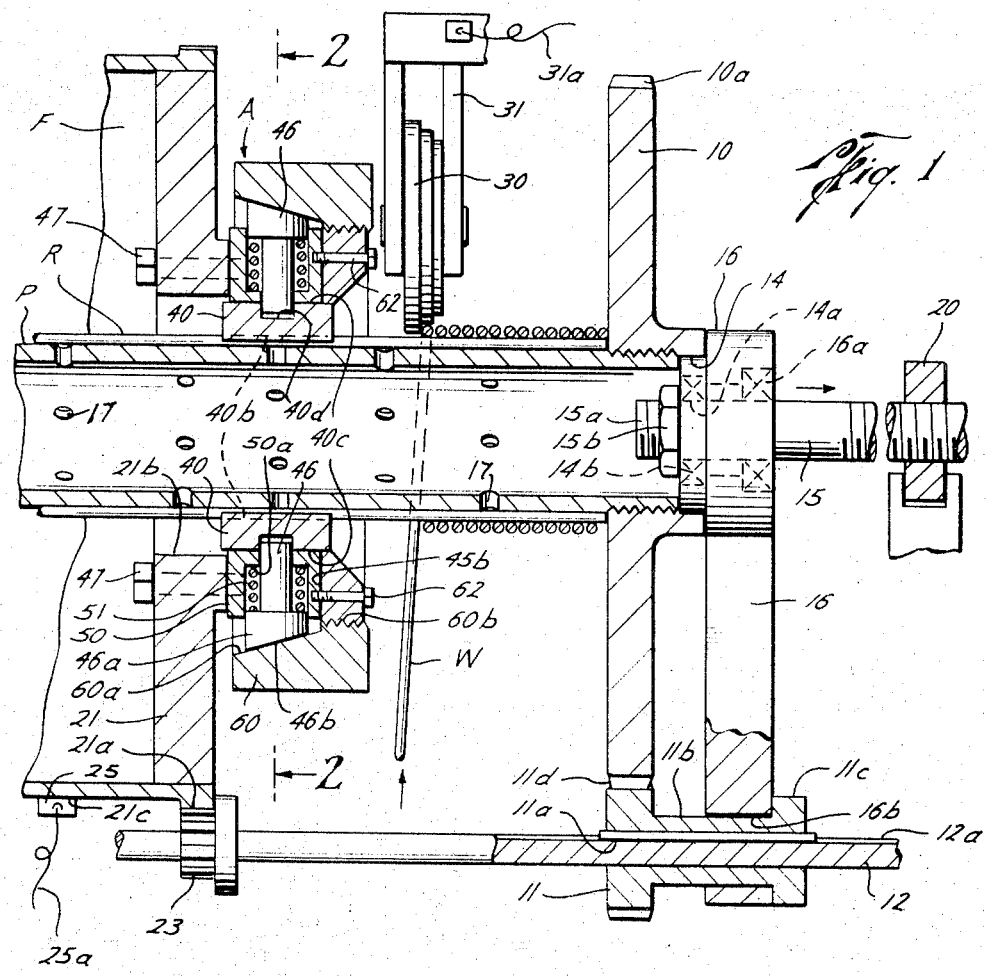
FIG. 1 is a vertical sectional view of the apparatus of this invention mounted in position for its intended use in the formation of wrapped wire screen.

In the drawings, the letter P designates a perforated pipe or tubular support upon which a plurality of longitudinally extending rib wires R are disposed in circumferentially spaced relationship to each other. The apparatus of this invention is a clamping and guide apparatus A which is a part of other apparatus illustrated in FIG. 1 for forming well screen by wrapping a wire or wires W thereon and welding same with spaces between the wraps of the wire W to form slits of the well screen of predetermined dimensions.

To understand the present invention as embodied in the apparatus A for clamping and guiding the rib wires R, a portion of the apparatus that is used therewith in the formation of well screen is illustrated in FIG. 1 partially schematically. Thus, the pipe P has perforations 17 of the conventional type illustrated also in U. S. Pat. No. 2,327,686. The pipe P is shown herein as threaded or as otherwise connected to a large gear 10 which is driven by a smaller gear 11 connected to a power shaft 12 by a splined sliding connection which includes coacting splines 11a on the gear 11 and 12a on the drive rod 12. The rod 12 extends to a source of power which may be at either end thereof since the rod itself does not move longitudinally and conventionally, such rod 12 is driven by an electric motor (not shown).

The gear 10 has a plate 14 or a similar structure integral therewith or connected thereto so as to rotate with the gear 10. Such plate 14 has an opening 14a at its center portion through which extends the left-hand threaded end 15a of a lead screw 15. The lead screw 15 has a nut 15b or other suitable attaching means thereon which is large enough to provide an abutment against the plate 14 for imparting longitudinal movement of the lead screw 15 to the right to the plate 14 and thus to the pipe P and the parts therewith, as will be more evident hereinafter. A bearing 14b may be provided with the plate 14 to reduce the frictional engagement between the plate 14 and the lead screw 15 as the plate 14 rotates relative to the lead screw 15.

A non-rotating frame member 16 is disposed forwardly or to the right of the gear 10 and the plate 14 and it may have a support bearing or surface 16a through which the lead screw 15 extends. The supporting frame 16 also has a supporting opening 16b through which the shank 11b from the gear 11 extends and it engages a shoulder 11c which transmits movements of the frame 16 to the gear 11 so that the gear 11 and the gear 10 move longitudinally together by the feeding of the lead screw 15, as will be more fully explained, and thereby the gear teeth 11d and 10a remain in operable engagement at all times.

The lead screw 15 is illustrated only partially in FIG. 1 and a driving nut 20 which is in threaded engagement therewith is only schematically illustrated. Such nut 20 is driven or rotated at a fixed location remotely from the left-hand end 15a of the lead screw 15 so as to cause the lead screw 15 to move longitudinally to the right as indicated by the arrow in FIG. 1, without rotating such lead screw 15.

A relatively large frame F, a portion of which is illustrated in FIG. 1, includes a rotatable frame member 21 having gear teeth 21a thereon which engage with the gear teeth of a gear 23 which is preferably mounted on and is driven by the power shaft or rod 12, so as to coordinate its driving with the rotation of the gear 11. The frame member 21 has a central opening 21b therethrough for receiving the pipe P and the longitudinally extending rib wires R as they are moved therethrough and as they are fed longitudinally to the right as viewed in FIG. 1 during the wrapping of the wire W on the rib wires R. The rotatable portion of the frame F also has a circular ring or surface 21c which is engaged by an electrical contact 25 connected to an electrical wire 25a which is a part of the conventional resistance welding circuit. The contact 25 does not rotate, but it maintains constant electrical contact with the contact ring or surface 21c as the frame portion 21 is rotated, as will be more evident hereinafter.

The other part of the electrical resistance welding circuit which is partially illustrated in FIG. 1 includes a rotating weld wheel 30 which is adapted to engage each of the wraps of the wire W as it is wrapped thereon to maintain same in contact with the external surfaces of the rib wires R for the electrical resistance welding thereof together, as is well understood. The welding wheel 30 is supported in any conventional wheel support 31 and an electrical wire 31a is electrically connected thereto for transmitting the electrical current and completing the electrical circuit through the apparatus so that the electrical resistance is developed at the point of contact between the wrapping wire W and the particular rib wire R therebelow at the point of the wheel 30 so as to weld them together, as is well understood.

The clamping apparatus A of this invention provides for the clamping and the guiding of the longitudinally extending rib wires R as they are moved longitudinally relative to such apparatus A by the movement of the lead screw 15 pulling the pipe P and the rib wires R therewith, as previously explained. Thus, the apparatus A includes a plurality of arcuate clamping and guide shoes 40 which are disposed in a generally ring shape, and each of which has it ends 40a spaced from the adjacent ends of the other guide shoes 40 so that there can be radial movement of the shoes 40, as will be more evident hereinafter. Each of the guide shoes 40 has a plurality of longitudinally extending grooves with the groove surfaces 40b which are preferably formed as a pair of inclined surfaces angled so as to be larger at the bottom and intersecting at the top. Such surfaces 40b of the grooves thus contact the rib wires R at least two points and as the wear occurs on such surfaces 40b, the contact with the rib wires R is maintained even though the shoes 40 move inwardly relative to such rib wires R.

An outer support member 45 which is preferably annular and which has an inner surface 45a which is radially spaced outwardly from the outer surfaces 40c of the guide shoes 40 is provided for supporting a plurality of centering or positioning pins 46. The support ring 45 is secured to the frame F by any suitable means such as machine bolts or screws 47 (FIG. 1). By reason of such connection to the frame F, the entire clamping and guiding apparatus A rotates with the rotatable portion of such frame F and thus there is no rotational relative movement between the guide and clamping shoes 40 and the rib wires R or the pipe P.

Figure 2:
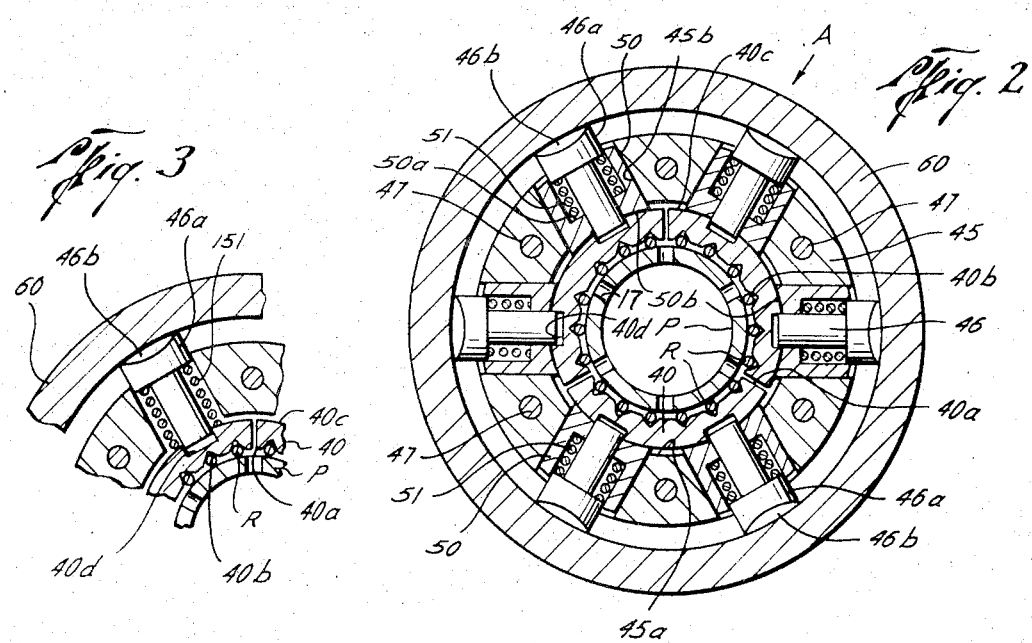
FIG. 2 is a view taken on line 2—2 of FIG. 1 and it illustrates the details of one form of the apparatus of this invention.

In the embodiment illustrated in FIGS. 1 and 2 of the drawings, each of the positioning or centering pins 46 extends into a recess 40d of the shoes 40 so as to prevent any longitudinal shifting of such shoes 40 relative to the support member 45. The pins 46 have an enlarged head portion 46a which is slidably disposed in a plunger 50 which in turn is slidably disposed in a substantially radial opening 45b. A resilient means such as a coil spring 51 is confined between the pin head 46 and a shoulder 50a in the plunger 50 for each of the positioning pins 46. The springs 51 are under compression so that they exert a force urging each plunger 50 radially inwardly to maintain contact between its inner curved surface 50b and the external surface 40c of the particular shoe 40 with which it is associated.

The head 46a of each pin 46 preferably has an inclined cam surface 46b which is adapted to engage a corresponding inclined cam surface 60a formed inwardly of an outer pin-positioning ring 60. The ring 60 is threaded or is otherwise connected to the ring 45 at threads 60b (FIG. 1) so that upon a rotation of the ring 60 relative to the ring 45, the pins 46 are urged radially inwardly by the engagement of the coacting cam surfaces 46b and 60a, as will be more fully explained.

In some instances, it may not be necessary or desirable to have the plungers 50 move radially, but instead, the springs 51 are used merely to keep the cam surfaces 46b in engagement with the cam surface 60a. In such instances, the plungers 50 may be secured against movement relative to the support member or ring 45 by a removable set screw 62 for each of the plungers 50 (FIG. 1). When it is desired to let the plungers 50 move in response to the radial urging of the resilient springs 51, such set screws 62 are released or removed from the plungers 50.

Considering now the operation and use of the apparatus of this invention as particularly shown in FIGS. 1 and 2, the rib wires R are initially positioned on the pipe P in the known manner and are clamped thereon with the guide shoes 40, with one rib wire R in each of the grooves provided by the groove surfaces 40b, as previously explained and as illustrated in FIG. 2. The initial compression of the springs 51 is set by the threading of the outer pin positioning ring 60 on the threads 60b and the coaction of the cam surfaces 46b and 60a, as explained. When the pins 62 are omitted or are removed or released, the resilient springs 51 urge the plungers 50 radially inwardly so that their inner surfaces 50b continually urge the guide shoes 40 radially inwardly. This maintains a constant engagement of the groove surfaces 40b with the rib wires R even though there is wear on such surfaces 40b by reason of the longitudinal movement of the rib wires R relative to such surfaces 40b. It should also be observed that variations in the external diameter of the pipe P which have a tendency to move the wires 7 radially outwardly such as might be due to an upset portion of the pipe P or variations in its diameter at the external surface thereof, may be compensated for by the outward radial movement of the shoes 40. Such outwardly radial movement of the shoes 40 is made possible because of the spacing between the surfaces 40c and 45a and because the springs 51 are adapted to be compressed as the guide shoes 40 are moved outwardly. There is a sufficient space inwardly of the ends of the pins 46 in each of the recesses 40d to permit such outward radial movement of the shoes 40. Thus, variations of various kinds may occur while still maintaining the electrical circuit between the wire 25a and the wire 31a and the circuit which is disposed externally thereof and connected to such wires so that the electrical resistance welding of the wire W to the rib wires R is uniformly assured at all times. It should also be noted that the compensation for wear is automatic with the embodiment described in connection with FIGS. 1 and 2 unless the retaining set screws 62 are in engagement in the position shown in FIG. 1, in which case, the adjustment for wear is accomplished manually by the operator rotating the pin positioning ring 60 as wear occurs on the guide surfaces 40b.

It should also be appreciated that instead of having the slidable plungers 50, they may be made integral with the support member or ring 45, in which case the wear on the guide surfaces 40b is accomplished only manually rather than automatically and this would be done in the same manner by the rotation of the pin-positioning ring 60 and the coaction of the cam surfaces 60a and 46b as previously explained.

Figure 3:
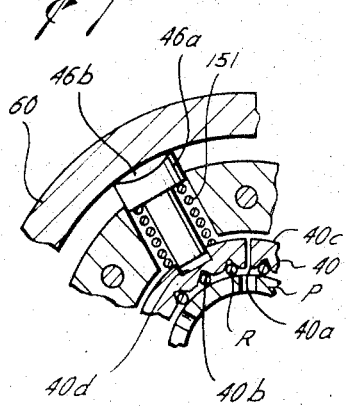
FIG. 3 is a partial sectional view illustrating an alternate embodiment of the present invention.

In FIG. 3, an alternate embodiment of the present invention is shown wherein the sliding plungers 50 are eliminated and instead the spring 51 has been replaced by a longer spring 151 which engages the external surface 40c of the guide shoe 40 with which it is associated so as to directly apply the resilient force of the spring 151 to the guide shoe 40. Otherwise, the structure of the alternate form of the invention shown in FIG. 3 is the same as that illustrated in FIG. 2 and the parts are accordingly identified with corresponding numerals and/or letters. The operation is likewise the same for the alternate form of FIG. 3 as for the embodiment illustrated in FIGS. 1 and 2 with the set screws 62 omitted. Thus, the embodiment of FIG. 3 is entirely automatic for compensating for wear, variations in the surface of diameter of the pipe P and also variations in the pipe P such as occurring at the ends of an upset pipe.

With the present invention, the wires W are wrapped very tightly on rib wires R and the perforated pipe P, regardless of variations in the external diameter of the pipe P, so that in the final wrapped pipe, there is no slippage of the wires R and W relative to the pipe P, thereby eliminating the need for further securing of the wires R and W to the pipe. When the wrapping of the wires W is completed for a predetermined length, the pipe P is unthreaded from the gear 10 and is otherwise removed from the apparatus so that the final product includes the perforated pipe P, rib wires R and wrapping wires W. It should be understood that the pipe P may not be perforated throughout its full length, and the wrapping wires W are normally applied only over that portion of the pipe P that is perforated.

The foregoing disclosure and description of the invention are illustrative and explanatory thereof, and various changes in the size, shape, and materials, as well as in the details of the illustrated construction may be made without departing from the spirit of the invention.

I claim:

1. Apparatus for clamping and guiding longitudinally disposed rib wires for the resistance welding thereof to wire wrapped thereon, comprising:

a plurality of arcuate clamping and guide shoes disposed in a generally ring-shape, with each of said shoes having end surfaces spaced from the end surfaces of the adjacent shoes to enable said shoes to move radially;

each of said shoes having a plurality of grooves in its inner surface, with each of said grooves having at least one surface adapted to engage one of the rib wires; and means for urging said guide shoes radially inwardly to maintain the contact between each of said surfaces of said grooves and the rib wires as wear occurs on said surfaces.

2. The structure set forth in claim 1, wherein said urging means includes:

support means positioned outwardly of said guide sleeves:

a plurality of substantially radially disposed pins mounted in said support means for substantially radial movement relative thereto; and a pin-positioning ring disposed outwardly of said support means for predetermining the outward extent of said pins.

3. The structure set forth in claim 2, including:

means connecting said pin-positioning ring to said support ring; and coacting surfaces on said pin-positioning ring and said pins for adjusting the outward extent of said pins.

4. The structure set forth in claim 1, wherein said urging means includes:

resilient means acting on each of said guide shoes for urging same radially inwardly to automatically compensate for wear on said surfaces of said grooves.

5. The structure set forth in claim 4, wherein said resilient means for each of said guide shoes includes:

at least one plunger slidably disposed in said support means for substantially radial movement and having an inner surface engageable with one of the guide shoes; and a spring acting on said plunger and urging same radially inwardly to maintain the contact between said inner surface thereof and said one of the guide shoes.

6. The structure set forth in claim 1, wherein said urging means includes:

support means positioned outwardly of said guide shoes;

a plurality of substantially radially disposed pins mounted in said support means for substantially radial movement relative thereto;

a pin-positioning ring disposed outwardly of said support means for predetermining the outward extent of said pins; and resilient means for each of said pins urging same outwardly to maintain the pins in contact with said pin-positioning ring.

7. The structure set forth in claim 6, wherein:
said resilient means for each of said pins also acts on one of said guide shoes for urging same radially inwardly.

8. The structure set forth in claim 7, wherein said rib wires are supported on a pipe, and;
said guide shoes have outer surfaces spaced inwardly from said support means for permitting limited outward movements of said shoes relative to said support means and acting to compress said resilient means whereby inward and outward substantially radial movements of said guide shoes automatically occurs in response to variations in the diameter of the pipe supporting said rib wires.

9. The structure set forth in claim 2, wherein:
said pin-positioning ring has an inner inclined cam surface; and
each of said pins has an outer inclined cam surface coacting with said cam surface of said pin-positioning ring for adjusting the outward limits of movement of said pins by a rotation of said pin-positioning ring relative to said pins.

10. The structure set forth in claim 1, wherein:
said one surface of each of said grooves is inclined and intersects another inclined surface to form a pair of surfaces engageable with each of said rib wires for assuring contact therewith as said guide shoes are adjusted inwardly to compensate for wear on said surfaces.

* * * * *